United States Patent Office 3,100,206
Patented Aug. 6, 1963

3,100,206
O-(1,6-DIHYDRO-6-OXO-3-PYRIDAZINYL) O-ALKYL PHOSPHORAMIDATE AND PHOSPHORAMIDOTHIOATE
Raymond H. Rigterink, Midland, Mich., assignor to The Dow Chemical Company, Midland, Mich., a corporation of Delaware
No Drawing. Filed May 5, 1961, Ser. No. 107,903
7 Claims. (Cl. 260—250)

The present invention is directed to the phosphoramidates and phosphoramidothioates corresponding to the formula

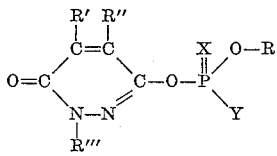

In this and succeeding formulae, X represents oxygen or sulfur, R represents lower alkyl, Y represents amino or lower alkylamino, R''' represents hydrogen, lower alkyl, phenyl, chlorophenyl, bromophenyl or nitrophenyl, R' and R'' each represent hydrogen, methyl, chlorine, bromine and when taken together R' and R'' represent the residue of a benzene ring. In the present specification and claims, the expression "lower alkyl" is employed to refer to the alkyl radicals containing from 1 to 5 carbon atoms, inclusive. These compounds are liquid or crystalline materials which are somewhat soluble in many common organic solvents and of very low solubility in water. The compounds are useful as parasiticides and are adapted to be employed for the control of many mites, insects, and bacterial and fungal organisms such as aphids, beetles, ticks and worms.

The novel compounds of the present invention may be prepared by several methods. In a preferred method, the compounds are prepared by reacting an O-lower alkyl phosphoramidochloridate or phosphoramidochloridothioate corresponding to the formula

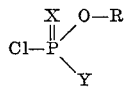

with a 1,2-dihydro-3,6-pyridazinedione corresponding to the formula

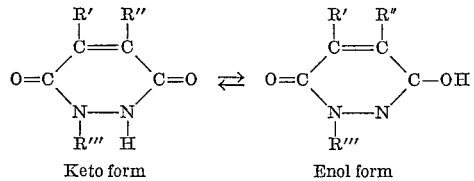

Keto form      Enol form or with an alkali metal salt of said pyridazinedione compound. In such method the reaction between the phosphoramidochloridate or phosphoramidochloridothioate and pyridazinedione compound is carried out in the presence of an alkali metal salt such as an alkali metal carbonate. The reaction conveniently is carried out in an inert organic liquid such as dimethyl formamide, benzene, toluene, acetone or chloroform. The amounts of the reagents to be employed are not critical, some of the desired product being obtained when employing any proportion of the reagents. In the preferred method of operation, good results are obtained when employing substantially equimolecular proportions of the alkali metal carbonate, the 1,2-dihydro-3,6-pyridazinedione compound and phosphoramidochloridate or phosphoramidochloridothioate, or substantially equimolecular proportions of the alkali metal salt of the pyridazinedione compound and the phosphoramidochloridate or phosphoramidochloridothioate. The reaction takes place smoothly at the temperature range of from 10° to 100° C. with the production of the desired product and alkali metal chloride byproduct. In carrying out the reaction, the reactants are mixed and contacted together in any convenient fashion and the resulting mixture maintained for a period of time in the reaction temperature range to insure completion of the reaction. Following the reaction, the reaction mixture is washed with water and any reaction medium removed by fractional distillation under reduced pressure to obtain the desired product as a residue. This product may be further purified by conventional procedures such as washing with dilute aqueous alkali metal hydroxide and washing with water, solvent extraction, and recrystallization.

In an alternative procedure, the new compounds are prepared by reacting an O-lower alkyl phosphorodichloridate or O-lower alkyl phosphorodichloridothioate having the structure

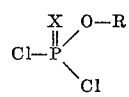

with an alkali metal salt of the 1,2-dihydro-3,6-pyridazinedione compound as previously defined to produce an intermediate diester phosphorochloridate or phosphorochloridothioate having the structure

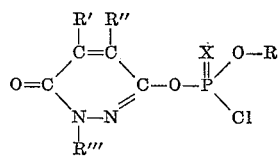

This intermediate is thereafter reacted with ammonia or a lower alkylamine to produce the desired phosphoramidate or phosphoramidothioate product. The reaction conveniently is carried out in a reaction medium such as benzene, chloroform, toluene or dimethyl formamide. Good results are obtained when employing substantially equimolecular proportions of the O-lower alkyl phosphorodichloridate or phosphorodichloridothioate and alkali metal salt compound and at least two molecular proportions of ammonia or alkylamine. The reaction with the alkali metal salt of the 1,2-dihydro-3,6-pyridazinedione compound is carried out at temperatures of from −40° to 70° C. The reaction betwen the phosphorochloridate or phosphorochloridothioate intermediate and ammonia or lower alkylamine takes place smoothly at the temperature range of from −10° to 30° C. The temperature may be controlled by regulating the rate of mixing and contacting the reactants together and by external cooling. The byproduct in both steps of the reaction is chloride. In the first step, the chloride appears as an alkali metal chloride. In the second step, the chloride appears as the hydrochloride salt of the amine or ammonia reactants. Following the reaction, the desired product may be separated in accordance with conventional procedures as previously described.

The following examples merely illustrate the invention and are not to be construed as limiting:

*Example 1.—O-(1,6-Dihydro-1-Methyl-6-Oxo-3-Pyridazinyl) O-Methyl N-Methyl Phosphoramidothioate*

O-methyl N-methyl phosphoramidochloridothioate (16 grams; 0.1 mole) was added rapidly to 12.6 grams (0.1 mole) of 1,2-dihydro-1-methyl-3,6-pyridazinedione and 10.6 grams (0.1 mole) of sodium carbonate dispersed in 150 milliliters of dimethyl formamide. The addition was carried out with stirring and at a temperature of from 24° to 29° C. Stirring was thereafter continued and the temperature of the resulting mixture raised to and maintained at from 60° to 65° C. for one hour to insure completion of the reaction. The reaction mixture was then diluted with 500 milliliters of water and 200 milliliters of benzene. During the dilution, the mixture separated into an aqueous layer and a liquid organic layer. The organic layer was separated by decantation, successively washed with water and low boiling constituents removed from the washed mixture by fractional distillation under reduced pressure. As a result of these operations, there was obtained an O-(1,6-dihydro-1-methyl-6-oxo-3-pyridazinyl) O-methyl N-methyl phosphoramidothioate product as a liquid residue having a refractive index $n/D$ of 1.5205 at 25° C.

*Example 2.—O-(1-Phenyl-1,6-Dihydro-6-Oxo-3-Pyridazinyl) O-Methyl N-Isopropyl Phosphoramidate*

1-phenyl-1,2-dihydro-3,6-pyridazinedione (18.8 grams; 0.1 mole), aqueous 50 percent sodium hydroxide (equivalent to 0.1 mole of NaOH) and 250 milliliters of isobutyl methyl ketone were mixed together and heated at the boiling temperature with stirring to produce the sodium salt of 1-phenyl-1,2-dihydro-3,6-pyridazinedione. The heating was carried out with the distillation of some of the reaction medium together with the water of reaction as formed. 14.9 grams (0.1 mole) of O-methyl phosphorodichloridate was added rapidly to the above mixture containing the sodium salt. The addition was carried out with stirring and at a temperature of about −40° C. Stirring was thereafter continued for one hour as the temperature of the reaction mixture was allowed to raise to about 0° C. To this mixture containing the intermediate phosphorochloride product was added portionwise 11.8 grams (0.2 mole) of isopropyl amine. The addition was carried out in about 10 minutes and at a temperature of from −10° to 0° C. Following the addition, stirring was continued for two hours as the temperature of the mixture came to room temperature. The reaction mixture was then filtered and low boiling constituents removed from the filtrate by fractional distillation under reduced pressure to obtain an O-(1-phenyl-1,6-dihydro-6-oxo-3-pyridazinyl) O-methyl N-isopropyl phosphoramidate product as a liquid residue having a refractive index $n/D$ of 1.5247 at 25° C.

*Example 3.—O-(1,6-Dihydro-6-Oxo-3-Pyridazinyl) O-Methyl Phosphoramidothioate*

1,2-dihydro-3,6-pyridazinedione (11.2 grams; 0.1 mole), aqueous 50 percent sodium hydroxide (equivalent to 0.1 mole of NaOH) and 250 milliliters of isobutyl methyl ketone were mixed together and heated at the boiling temperature in the manner as previously described to prepare the sodium salt of 1,2-dihydro-3,6-pyridazinedione. O-methyl phosphorodichloridothioate (16.5 grams; 0.1 mole) was added rapidly to the above mixture with stirring and at a temperature of about 4° C. Stirring was thereafter continued for one hour as the reaction temperature was allowed to reach room temperature. Ammonia (3.4 grams; 0.2 mole) was then introduced with stirring to the above mixture containing the phosphorchloridothioate intermediate. The addition was carried out over a period of about ½ hour and at a temperature of 30° C. with stirring being continued for two hours as the reaction mixture came to room temperature. The reaction mixture was then filtered and low boiling constituents removed from the filtrate by vacuum distillation to obtain an O-(1,6-dihydro-6-oxo-3-pyridazinyl) O-methyl phosphoramidothioate product as a liquid residue having a refractive index $n/D$ of 1.5040 at 25° C.

*Example 4.—O-(4,5-Dichloro-1,6-Dihydro-6-Oxo-3-Pyridazinyl) O-Methyl N-Methyl Phosphoramidothioate*

O-methyl N-methyl phosphoramidochloridothioate (16 grams; 0.1 mole) was added rapidly with stirring and at a temperature of about 25° C. to 18.1 grams; (0.1 mole) of 4,5-dichloro-1,2-dihydro-3,6-pyridazinedione, and 0.1 mole of sodium carbonate dispersed in 150 milliliters of dimethyl formamide. Stirring was thereafter continued and the temperature of the reaction mixture raised to and maintained at from 60° to 65° C. for one hour to complete the reaction. The reaction mixture was thereafter diluted with 200 milliliters of benzene, the diluted mixture successively washed with water and low boiling constituents removed from the washed mixture by vacuum distillation. As a result of these operations, there was obtained an O-(4,5-dichloro-1,6-dihydro-6-oxo-3-pyridazinyl) O-methyl N-methyl phosphoramidothioate product as a crystalline solid. This product was crystallized from a petroleum ether-propylene dichloride mixture and found to melt at 120° to 122° C.

In a similar manner, other products of the present invention are prepared as follows:

O-(1,6-dihydro-6-oxo-3-pyridazinyl) O-methyl N-isopropyl phosphoramidothioate (melting at 102° to 105° C.) by reacting together the sodium salt of 1,2-dihydro-3,6-pyridazinedione, O-methyl phosphorodichloridothioate, and isopropyl amine.

O-(1-phenyl-1,6-dihydro-6-oxo-3-pyridazinyl) O-methyl N-methyl phosphoramidothioate ($n/D$ of 1.5401 at 25° C.) by reacting together 1-phenyl-1,2-dihydro-3,6-pyridazinedione, potassium carbonate and O-methyl N-methyl phosphoramidochloridothioate.

O-(5-chloro-1-methyl-1,6-dihydro-6-oxo-3-pyridazinyl) O-methyl N-methyl phosphoramidate by reacting together the sodium salt of 5-chloro-1-methyl-1,2-dihydro-3,6-pyridazinedione and O-methyl N-methyl phosphoramidochloridate.

O-[1-(p-nitrophenyl)-1,6-dihydro-6-oxo-3-pyridazinyl] O-methyl N-isopropyl phosphoramidothioate ($n/D$ of 1.53080 at 25° C.) by reacting together 1-(p-nitrophenyl)-1,2-dihydro-3,6-pyridazinedione, sodium carbonate and and O-methyl N-isopropyl phosphoramidochloridothioate.

O-(1,6-dihydro-6-oxo-3-pyridazinyl) O-methyl N-sec. butyl phosphoramidothioate (melting at 109°–111° C.) by reacting together 1,2-dihydro-3,6-pyridazinedione, sodium carbonate and O-methyl N-sec. butyl phosphoramidochloridothioate.

O - (4,5 - dibromo - 1,6 - dihydro - 6 - oxo - 3 - pyridazinyl) O-methyl N-diamyl phosphoramidate by reacting together the sodium salt of 4,5-dibromo-1,2-dihydro-3,6-pyridazinedione and O-methyl N-diamyl phosphoramidochloridate.

O - (1,4 - dimethyl - 1,6 - dihydro - 6 - oxo - 3 - pyridazinyl) O-ethyl N-amyl phosphoramidate by reacting together the sodium salt of 1,4-dimethyl-1,2-dihydro-3,6-pyridazinedione and O-ethyl N-amyl phosphoramidochloridate.

O - (1,6 - dihydro - 6 - oxo - pyridazinyl) O-ethyl N-ethyl phosphoramidothioate ($n/D$ of 1.5302 at 25° C.) by reacting together the potassium salt of 1,2-dihydro-3,6-pyridazinedione and O-ethyl N-ethyl phosphoramidochloridothioate.

O-(4-bromo-1-phenyl-1,6-dihydro-6-oxo-3-pyridazinyl) O-butyl N-diethyl phosphoramidochloridothioate by reacting together the sodium salt of 4-bromo-1-phenyl-1,2-dihydro-3,6-pyridazinedione and O-butyl N-diethyl phosphoramidochloridothioate.

O-(1,6-dihydro-6-oxo - 3 - pyridazinyl) O-isopropyl N-methyl phosphoramidothioate ($n/D$ of 1.5308 at 25° C.) by reacting together the sodium salt of 1,2-dihydro-3,6-pyridazinedione and O-isopropyl N-methyl phosphoramidochloridothioate.

O-(4,5-dichloro-1-phenyl-1,6-dihydro-6-oxo - 3 - pyridazinyl) O-methyl N-methyl phosphoramidothioate by reacting together the sodium salt of 4,5-dichloro-1-phenyl-1,2-dihydro-3,6-pyridazinedione and O-methyl phosphoramidochloridothioate.

O-(1,6-dihydro - 6 - oxo - 3 - pyridazinyl) O-isobutyl N- methyl phosphoramidothioate (melting at 99° to 102° C.) by reacting together 1,2-dihydro-3,6-pyridazinedione, potassium carbonate and O-isobutyl N-methyl phosphoramidochloridothioate.

O-[4,5-dimethyl-1-(o-chlorophenyl) - 1,6 - dihydro - 6-oxo-3-pyridazinyl] O-methyl N-methyl phosphoramidate by reacting together 4,5-dimethyl-1-(o-chlorophenyl)-1,2-dihydro-3,6-pyridazinedione, sodium carbonate and O-methyl N-methyl phosphoramidochloridate.

O-(1 - phenyl - 1,6 - dihydro - 6 - oxo - 3 - pyridazinyl) O-methyl N-isopropyl phosphoramidothioate ($n/D$ of 1.5692 at 25° C.) by reacting together 1-phenyl-1,2-dihydro - 3,6 - pyridazinedione, potassium carbonate and O-methyl N-isopropyl phosphoramidochloridothioate.

O-(1-phenyl-1,6-dihydro-6-oxo-3-pyridazinyl) O-ethyl N-ethyl phosphoramidothioate ($n/D$ of 1.5688 at 25° C.) by reacting together 1-phenyl-1,2-dihydro-3,6-pyridazinedione, potassium carbonate and O-ethyl N-methyl phosphoramidochloridothioate.

O-(1,6-dihydro-6-oxo-3-pyridazinyl) O-methyl N-isopropyl phosphoramidate ($n/D$ of 1.463 at 25° C.) by reacting together the sodium salt of 1,2-dihydro-3,6-pyridazinedione, O-methyl phosphorodichloridate and isopropylamine.

O-(1,4,5-trimethyl-1,6-dihydro-6 - oxo - 3 - pyridazinyl) O-methyl N-ethyl phosphoramidothioate by reacting together the sodium salt of 1,4,5-trimethyl-1,2-dihydro-3,6-pyridazinedione, O-methyl phosphorodichloridothioate and diethylamine.

O-(1,6-dihydro-6-oxo-3-pyridazinyl) O-methyl N-diethyl phosphoramidothioate ($n/D$ of 1.5130 at 25° C.) by reacting together the sodium salt of 1,2-dihydro-3,6-pyridazinedione, O-methyl phosphorodichloridothioate and diethylamine.

O-(1-phenyl-1,6-dihydro-6-oxo-3-pyridazinyl) O-methyl N-propyl phosphoramidothioate ($n/D$ of 1.5732 at 25° C.) by reacting together the sodium salt of 1-phenyl-1,2-dihydro-3,6-pyridazinedione and O-methyl N-propyl phosphoramidochloridothioate.

O-[1-(p-bromophenyl)-1,6-dihydro-6 - oxo - 3 - pyridazinyl] O-methyl N-isopropyl phosphoramidothioate ($n/D$ of 1.5786 at 25° C.) by reacting together 1-(p-bromophenyl)-1,2-dihydro - 3,6 - pyridazinedione, sodium carbonate and O-methyl N-isopropyl phosphoramidochloridothioate.

O-[1-(m-nitrophenyl)-1,6-dihydro-6-oxo-3-pyridazinyl] O-methyl N-methyl phosphoramidate by reacting together the sodium salt of 1-(m-nitrophenyl)-1,2-dihydro-3,6-pyridazinedione and O-methyl N-methyl phosphoramidochloridate.

O-(3-amyl-3,4-dihydro-4-oxo-1-phthalazinyl) O-methyl phosphoramidate by reacting together the sodium salt of 2-amyl-2,3-dihydro-1,4-phthalazinedione and O-methyl phosphoramidochloridate.

O-(3,4-dihydro-4-oxo-1-phthalazinyl) O-methyl N-isopropyl phosphoramidothioate (melting at 156° to 158.5° C.) by reacting together the sodium salt of 2,3-dihydro-1,4-phthalazinedione and O-methyl N-isopropyl phosphoramidochloridothioate.

O-(3-ethyl-3,4-dihydro-4-oxo-1-phthalazinyl) O-methyl phosphoramidothioate by reacting together 2-ethyl-2,3-dihydro-1,4-phthalazinedione, potassium carbonate and O-methyl phosphoramidochloridothioate.

The novel compounds of the present invention have been found to be useful as parasiticides for the control of a number of parasite species. For such use, the products are dispersed on a finely divided solid and employed as dusts. Also, such mixtures may be dispersed in water with or without the aid of a surface active dispersing agent and the resulting aqueous suspensions employed as sprays. In other procedures, the products are employed as constituents in solvent solutions, water-in-oil or oil-in-water emulsions or aqueous dispersions. In representative operations, aqueous compositions containing 500 parts by weight of O-(1,6-dihydro-6-oxo-3-pyridazinyl) O-isopropyl N-methyl phosphoramidothioate give 100 percent kills of two spotted spider mites, bean aphids and Daphnia.

The pyridazinediones to be employed as starting materials in accordance with the teachings of the present invention are prepared by reacting phthalic anhydride, maleic anhydride, or a suitable bromo, chloro or methyl substituted maleic anhydride, with hydrazine or a suitable monoalkyl, monophenyl, or mono(substituted-phenyl) hydrazine. The reaction is carried out in a reaction medium such as water, alcohol or acetic acid and takes place readily at temperatures of from 75° to 120° C. with the production of the desired starting materials and water of reaction.

I claim:

1. A compound corresponding to the formula $$\begin{array}{c} R' \; R'' \\ | \;\; | \\ C=C \\ / \quad \quad \backslash \quad \quad X \quad O-R \\ O=C \quad \quad C-O-\overset{\|}{P} \\ \backslash \quad \quad / \quad \quad \backslash \\ N-N \quad \quad \quad Y \\ | \\ R''' \end{array}$$

wherein X represents a member of the group consisting of oxygen and sulfur, R represents lower alkyl, Y represents a member of the group consisting of amino and lower alkylamino, R''' represents a member of the group consisting of hydrogen, lower-alkyl, phenyl, bromophenyl, chlorophenyl and nitrophenyl, and R' and R'' each represent a member of the group consisting of hydrogen, methyl, chlorine, bromine and when taken together R' and R'' represent the α,Δ-(1,3-butadienylene) radical.

2. O-(1,6-dihydro - 6 - oxo- 3- pyridazinyl) O-methyl N-isopropyl phosphoramidothioate.

3. O-(1,6-dihydro - 6 - oxo-3-pyridazinyl) O-ethyl N-ethyl phosphoramidothioate.

4. O - (1,6-dihydro-6-oxo-3-pyridazinyl) O-isopropyl N-methyl phosphoramidothioate.

5. O-(1,6-dihydro-1-methyl - 6 - oxo - 1 - pyridazinyl) O-methyl N-methyl phosphoramidothioate.

6. O-(1-phenyl-1,6-dihydro-6-oxo - 3 - pyridazinyl) O-ethyl N-ethyl phosphoramidothioate.

7. O - (1-phenyl-1,6-dihydro-6-oxo - 3 - pyridazinyl) O-methyl N-isopropyl phosphoramidate.

References Cited in the file of this patent

UNITED STATES PATENTS

| 2,751,384 | Coover et al. | June 19, 1956 |
| 2,759,938 | Du Brevil | Aug. 21, 1956 |
| 2,875,233 | Blair et al. | Feb. 24, 1959 |

FOREIGN PATENTS

| 807,682 | Great Britain | Jan. 21, 1959 |